United States Patent
Abdallah et al.

(10) Patent No.: US 6,377,970 B1
(45) Date of Patent: *Apr. 23, 2002

(54) METHOD AND APPARATUS FOR COMPUTING A SUM OF PACKED DATA ELEMENTS USING SIMD MULTIPLY CIRCUITRY

(75) Inventors: Mohammad A. Abdallah; Vladimir Pentkovski, both of Folsom, CA (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/052,904

(22) Filed: Mar. 31, 1998

(51) Int. Cl.[7] .................................. G06F 7/52
(52) U.S. Cl. ......................... 708/603; 712/22
(58) Field of Search ............... 712/209, 22, 1, 712/25, 216–221, 224; 708/490, 201, 512, 521, 524, 402, 603, 441, 520, 525, 508, 620, 703, 629, 236; 707/7, 6

(56) References Cited

U.S. PATENT DOCUMENTS

| | | | | |
|---|---|---|---|---|
| 4,920,508 A | * | 4/1990 | Yassaie et al. | 708/603 |
| 5,594,679 A | * | 1/1997 | Iwata | 708/521 |
| 5,712,797 A | | 1/1998 | Descales et al. | |
| 5,719,642 A | | 2/1998 | Lee | |
| 5,721,697 A | * | 2/1998 | Lee et al. | 708/620 |
| 5,724,032 A | | 3/1998 | Klein et al. | |
| 5,734,420 A | | 3/1998 | Lee et al. | |
| 5,737,537 A | | 4/1998 | Gardos et al. | |
| 5,740,037 A | | 4/1998 | McCann et al. | |
| 5,742,529 A | | 4/1998 | Mennemeier et al. | |
| 5,760,961 A | | 6/1998 | Tompkin et al. | |
| 5,763,883 A | | 6/1998 | Descales et al. | |
| 5,787,210 A | | 7/1998 | Kim | |
| 5,790,208 A | | 8/1998 | Kwak et al. | |
| 5,793,661 A | * | 8/1998 | Dulong et al. | 708/603 |
| 5,793,879 A | | 8/1998 | Benn et al. | |
| 5,793,900 A | | 8/1998 | Nourbakhsh et al. | |
| 5,805,491 A | * | 9/1998 | Bechade | 708/708 |
| 5,805,913 A | * | 9/1998 | Guttag et al. | 712/209 |
| 5,841,676 A | | 11/1998 | Ali et al. | |
| 5,852,473 A | | 12/1998 | Horne et al. | |
| 5,865,752 A | | 2/1999 | Seyed-Bolorforosh et al. | |
| 5,876,342 A | | 3/1999 | Chen et al. | |
| 5,880,979 A | * | 3/1999 | Mennemeier et al. | 708/201 |
| 5,884,089 A | * | 3/1999 | Orian et al. | 712/1 |
| 5,901,248 A | | 5/1999 | Fandrianto et al. | |
| 5,907,842 A | * | 5/1999 | Mennemeier et al. | 707/7 |
| 5,935,863 A | | 8/1999 | Descales et al. | |
| 5,946,405 A | | 8/1999 | Kim et al. | |
| 6,026,483 A | * | 2/2000 | Oberman et al. | 712/221 |
| 6,032,170 A | * | 2/2000 | Guttag et al. | 708/620 |
| 6,085,213 A | * | 7/2000 | Oberman et al. | 708/603 |

OTHER PUBLICATIONS

Visual Instruction Set (VIS™), User's Guide, Sun Microsystems, Inc., version 1.1 Mar., 1997, pp. 41–43, 87–88.

\* cited by examiner

*Primary Examiner*—Richard L. Ellis
(74) *Attorney, Agent, or Firm*—Larry Mennemeier

(57) ABSTRACT

A method and apparatus that adds each one of multiple elements of a packed data together to produce a result. According to one such a method and apparatus, each of a first set of portions of partial products is produced using a first set of partial product selectors in a multiplier, each of the first set of portions of the partial products being zero. Each of the multiple elements is inserted into one of a second set of portions of the partial products using a second set of partial product selectors, each of the second set of portions of the partial products being aligned. Each of the multiple elements are added together to produce the result including a field having the sum of the multiple elements.

32 Claims, 12 Drawing Sheets

FIG. 12

METHOD AND APPARATUS FOR COMPUTING A SUM OF PACKED DATA ELEMENTS USING SIMD MULTIPLY CIRCUITRY

BACKGROUND OF THE INVENTION

1. Field of the Invention

The present invention relates to the field of microprocessors; more particularly, the present invention relates to a method and apparatus for computing a sum of absolute differences.

2. Description of Related Art

A sum of absolute differences is used in many applications including video applications such as Motion Pictures Expert Group (MPEG) encoding.

One method of computing a packed sum of absolute differences (PSAD) of packed data A having eight byte elements $A_0 \ldots A_7$ and packed data B having eight byte elements $B_0 \ldots B_7$ is to compute Ai–Bi and Bi–Ai for each value of i from 0 to 7, select the results that are non-negative, and add the non-negative results together. One implementation uses sixteen adders (two adders for each pair of byte elements), eight muxes (to select the non-negative values from each pair of results) and an adder tree to sum the non-negative results.

As more devices are used, more silicon area is needed in a semiconductor device. Semiconductor devices generally have a cost proportional to the silicon area used. Therefore, it is desirable to reduce the number of devices used to perform the PSAD instruction.

One method of computing a PSAD with less devices is to use the same device to serially operate on multiple data elements. For example, one adder may compute $A_0–B_0$ and $B_0–A_0$ sequentially, another may compute $A_1–B_1$ and $B_1–A_1$ sequentially, etc. This reduces the number of adders (silicon area) used, but increases the amount of time required to compute a PSAD.

What is needed is a method and apparatus to reduce the amount of silicon area required to implement a PSAD instruction without increasing the time required to compute the PSAD.

SUMMARY OF THE INVENTION

A method and apparatus that adds each one of multiple elements of a packed data together to produce a result is described. According to one such a method and apparatus, each of a first set of portions of partial products is produced using a first set of partial product selectors in a multiplier, each of the first set of portions of the partial products being zero. Each of the multiple elements is inserted into one of a second set of portions of the partial products using a second set of partial product selectors, each of the second set of portions of the partial products being aligned. Each of the multiple elements are added together to produce the result including a field having the sum of the multiple elements.

BRIEF DESCRIPTION OF THE DRAWINGS

FIG. 12 illustrates the alignment of the eight partial products in a Carry Save Adder (CSA) with Carry Lookahead Adder (CLA) tree according to one embodiment.

DETAILED DESCRIPTION

A method and apparatus to reduce the amount of silicon area required to implement a packed sum of absolute differences (PSAD) instruction without increasing the time required to compute the PSAD is disclosed.

The invention takes advantage of circuitry used to perform other single instruction multiple data (SIMD) operations such that only a relatively small amount of additional circuitry is needed to provide the PSAD instruction. In one embodiment, the PSAD instruction is implemented using two operations to generate a packed data having multiple absolute differences and an operation to sum the multiple absolute differences in the packed data to produce a PSAD.

One aspect of the invention is the use of the circuitry for a SIMD add operation to generate a packed data having multiple absolute differences by using each one of a set of sign bits to independently select the add or subtract operation for the corresponding packed data element having multiple differences. In one embodiment, when a sign bit indicates the difference in the corresponding packed data element is negative, the packed data element is subtracted from zero to produce the absolute value of the difference. When the sign bit indicates the difference in the corresponding packed data element is non-negative, the packed data element is added to zero to produce the absolute value of the difference.

Another aspect of the invention is the use of circuitry for a SIMD multiply or multiply-add, for example, to produce a sum of the packed data elements of a packed data by inserting the packed data elements into an adder tree that is used to sum the partial products in the SIMD multiply or SIMD multiply-add. In one embodiment, the packed data has packed data elements that are absolute differences. However, packed data elements containing other values may be summed using this method and apparatus.

In one embodiment, these two aspects of the invention are combined to produce a PSAD instruction. Alternatively, each aspect of the invention may be used independently with other instructions to perform the PSAD instruction.

In the following detailed description, numerous specific details are set forth in order to provide a thorough understanding of the described invention. Some of these specific details may not be required to practice the invention. In other instances, well-known structures, interfaces and processes have not been shown in detail in order to avoid obscuring the described invention.

Figure 1:
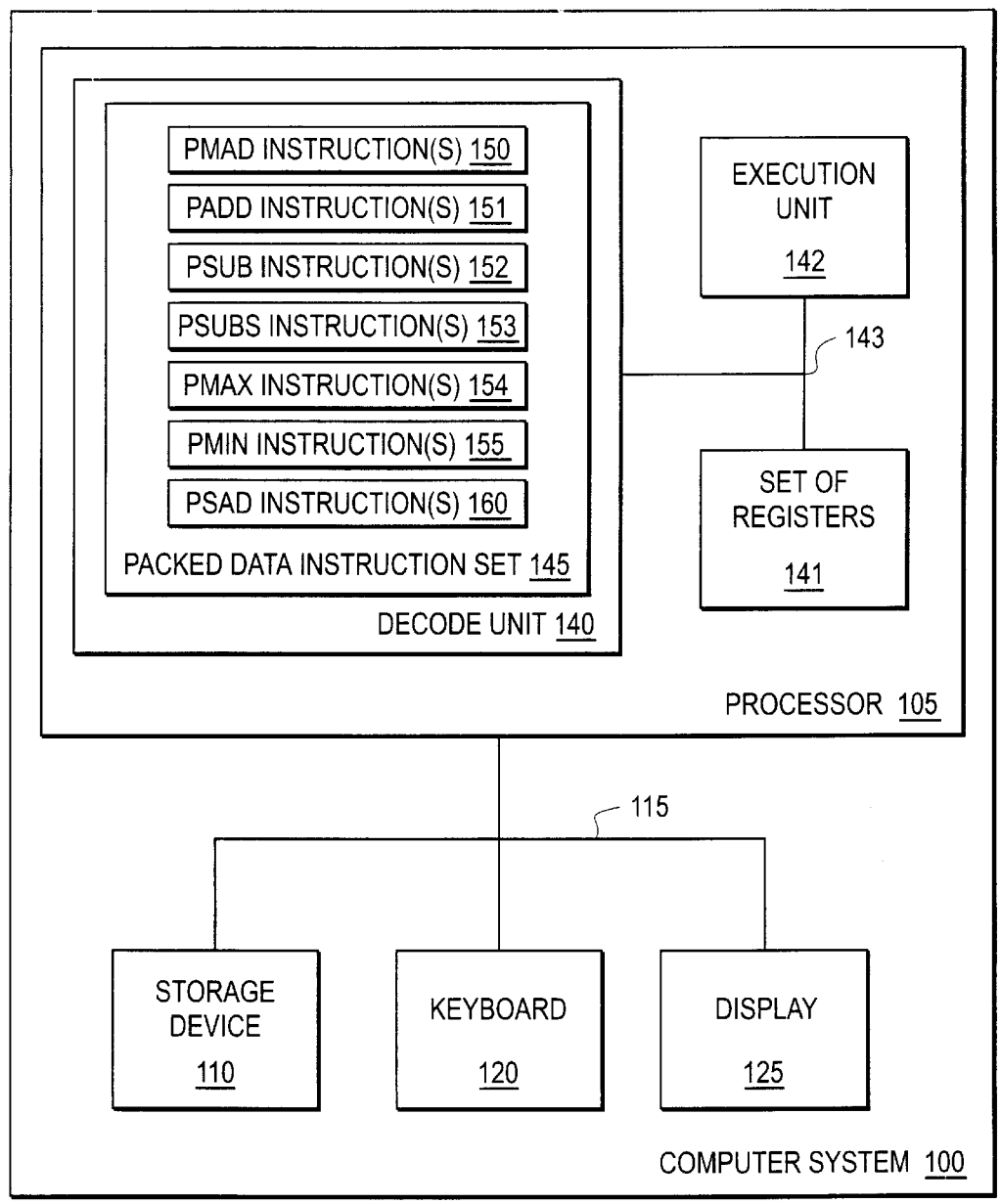
FIG. 1 shows a block diagram illustrating an exemplary computer system 100 according to one embodiment of the invention.

FIG. 1 shows a block diagram illustrating an exemplary computer system 100 according to one embodiment of the invention. The exemplary computer system 100 includes a processor 105, a storage device 110, and a bus 115. The processor 105 is coupled to the storage device 110 by the bus 115. In addition, a number of user input/output devices, such as a keyboard 120 and a display 125, are also coupled to the bus 115. The processor 105 represents a central processing unit of any type of architecture, such as a complex instruction set computer (CISC), reduced instruction set computer (RISC), very long instruction word (VLIW), or hybrid architecture. In addition, the processor 105 could be implemented on one or more chips. The storage device 110 represents one or more mechanisms for storing data. For example, the storage device 110 may include read only memory (ROM), random access memory (RAM), magnetic disk storage mediums, optical storage mediums, flash memory devices, and/or other machine-readable mediums. The bus 115 represents one or more busses (e.g., peripheral component interconnect (PCI), industry standard architecture (ISA), extended industry standard architecture (EISA), etc.) and bridges (also known as bus controllers). While this embodiment is described in relation to a single processor computer system, the invention could be implemented in a multi-processor computer system.

FIG. 1 illustrates that the processor 105 includes a decode unit 140, a set of registers 141, an execution unit 142, and an internal bus 143 for executing instructions. Of course, the processor 105 contains additional circuitry, which is not necessary to understanding the invention. The decode unit 140, the set of registers 141 and the execution unit 142 are coupled together by the internal bus 143. The decode unit 140 is used for decoding instructions received by the processor 105 into control signals and/or microcode entry points. In response to these control signals and/or microcode entry points, the execution unit 142 performs the appropriate operations. The decode unit 140, may be implemented using any number of different mechanisms (e.g., a look-up table, a hardware implementation, a PLA, etc.).

The decode unit 140 is shown including a packed data instruction set 145 for performing operations on packed data. In one embodiment, the packed data instruction set 145 includes a PMAD instruction(s) 150, a PADD instruction(s) 151, a packed subtract instruction(s) (PSUB) 152, a packed subtract with saturate instruction(s) (PSUBS) 153, a packed maximum instruction(s) (PMAX) 154, a packed minimum instruction(s) (PMIN) 155 and a packed sum of absolute differences instruction(s) (PSAD) 160. The operation of each of these instructions is further described herein. In one embodiment of the invention, the processor 105 supports the Pentium® microprocessor instruction set and the packed data instruction set 145. By including the packed data instruction set 145 into a standard microprocessor instruction set, such as the Pentium® microprocessor instruction set, packed data instructions can be easily incorporated into existing software (previously written for the standard microprocessor instruction set). Thus, many multimedia applications may be executed more efficiently by using the full width of a processor's data bus for performing operations on packed data. This eliminates the need to transfer smaller units of data across the processor's data bus to perform one or more operations one data element at a time. Other standard instruction sets, such as the PowerPC™ and the Alpha™ processor instruction sets may also be used in accordance with the described invention. (Pentium® is a registered trademark of Intel Corporation. PowerPC™ is a trademark of IBM, APPLE COMPUTER, and MOTOROLA. Alpha™ is a trademark of Digital Equipment Corporation.) Alternative embodiments of the invention may contain more or less, as well as different, packed data instructions and still utilize the teachings of the invention.

In one embodiment of the invention, the execution unit 142 operates on data in several different packed (non-scalar) data formats. For example, in one embodiment, the exemplary computer system 100 manipulates 64-bit data groups and the packed data can be in one of three formats: a "packed byte" format, a "packed word" format, or a "packed doubleword" (dword) format. Packed data in a packed byte format includes eight separate 8-bit data elements. Packed data in a packed word format includes four separate 16-bit data elements and packed data in a packed dword format includes two separate 32-bit data elements. Examples of particular operations are discussed below with reference to one packed data format. However, the operations apply similarly to any of the packed data formats of the invention.

In one embodiment, the opcodes of the instructions of the packed data instruction set 145 are encoded differently depending on whether they operate on signed data or unsigned data. In another embodiment, certain instructions only operate on one type of data: either unsigned or signed.

In the following description, packed byte data D having packed data elements Di, for example, refers to a single data structure D having N byte elements Di where i ranges from 0 to N−1. In one embodiment, a packed byte data D has eight byte elements. Thus, packed byte data D having packed data elements Di includes packed data elements $D_0$, $D_1$, $D_2$, $D_3$, $D_4$, $D_5$, $D_6$, and $D_7$. A reference to computing the packed data elements Fi of packed data F from a packed data D and a packed data E where each packed data element Fi is computed as the packed data element Di minus the packed data element Ei is a shorthand for $F_0=D_0-E_0$, $F_1=D_1-E_1$, $F_2=D_2-E_2$ ... $F_7=D_7-E_7$.

Figure 2:
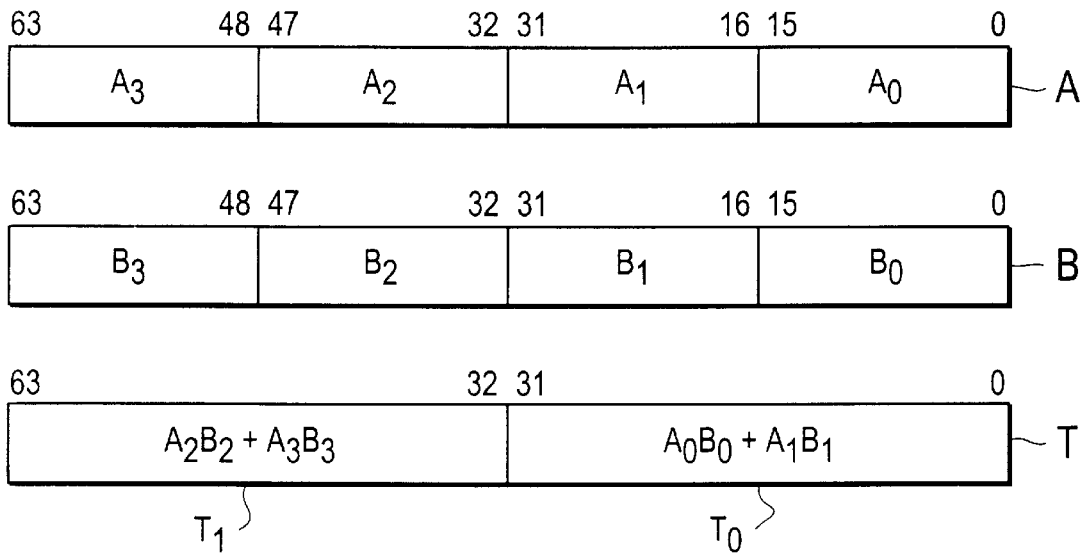
FIG. 2 illustrates one embodiment of a Packed Multiply-Add (PMAD) operation.

FIG. 2 illustrates one embodiment of the PMAD instruction 150. Each packed data element Ai of a packed word data A is multiplied by the corresponding packed data element Bi of a packed word data B to produce doubleword products that are summed by pairs to generate the two packed data elements $T_0$ and $T_1$ of a packed dword data T. Thus, $T_0$ is $A_1B_1+A_2B_2$ and $T_1$ is $A_3B_3+A_4B_4$. As illustrated, the packed data elements of packed dword data T are twice as wide as the packed data elements of the packed word data A and the packed word data B.

Figure 3:
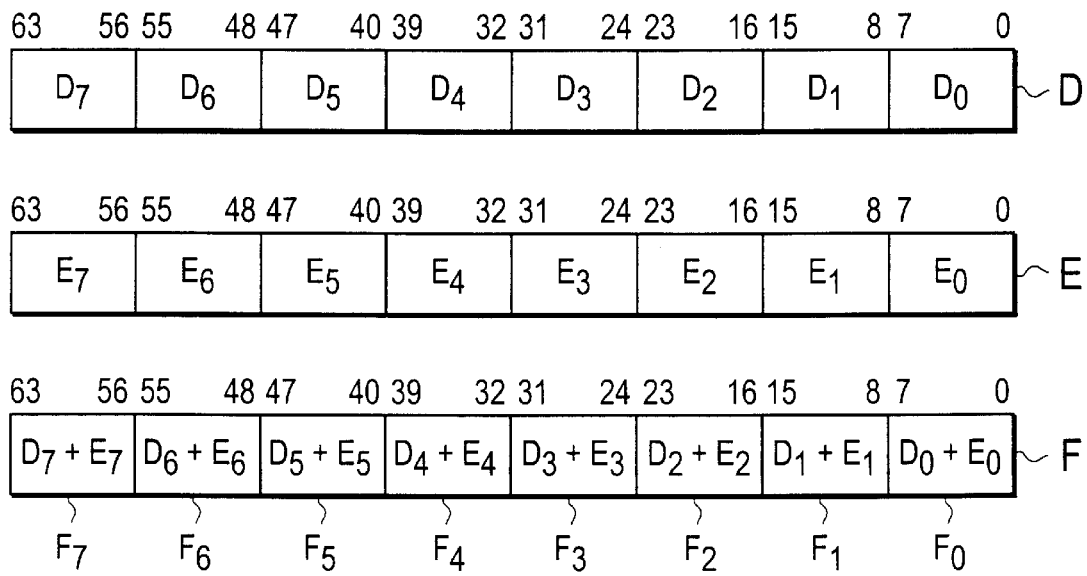
FIG. 3 illustrates one embodiment of a Packed Add (PADD) operation.

FIG. 3 illustrates one embodiment of the PADD instruction 151. Each packed data element Fi of a packed byte data F is the sum of a packed data element Di of a packed byte data D and a packed data element Ei of a packed byte data E. Similarly in the PSUB instruction 152, each packed data element Fi of the packed byte data F is the packed data element Di of the packed byte data D minus the packed data element Ei of the packed byte data E.

In the PSUBS instruction 153, each packed data element Fi of the packed byte data F is the packed data element Di of the packed byte data D minus the packed data element Ei of the packed byte data E, except that if the result of the subtraction is below a limit (minimum saturation value), the packed data element Fi is set at the minimum saturation value rather than the result of the subtraction.

Figure 4:
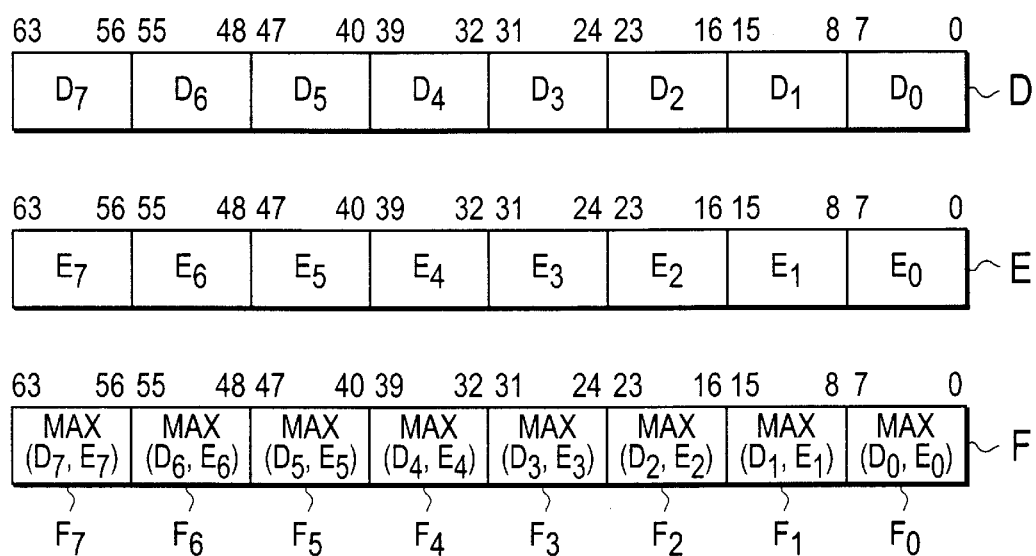
FIG. 4 illustrates one embodiment of a Packed Maximum (PMAX) operation.

FIG. 4 illustrates one embodiment of the PMAX instruction 154. Each packed data element Fi of the packed byte data F is the greater of packed data element Di of the packed byte data D and packed data element Ei of the packed byte data E. Similarly, in the PMIN instruction 155, each packed data element Fi of the packed byte data F is the lesser of packed data element Di of the packed byte data D and packed data element Ei of the packed byte data E.

In one embodiment, the packed data elements Ai and Bi are unsigned bytes and packed byte data A and packed byte data B have eight packed data elements each. Other embodiments of the PMAD instruction 150, PADD instruction 151, the PSUB instruction 152, and the PSUBS instruction 153, the PMAX instruction 154, and the PMIN instruction 155 may support other packed data types, such as those with different size packed data elements, a different number of packed data elements, and/or signed packed data elements. Furthermore, different rounding and saturation methods may be used.

In one embodiment, the PMAD instruction 150, PADD instruction 151, the PSUB instruction 152, and the PSUBS instruction 153, the PMAX instruction 154, and the PMIN instruction 155 are implemented as a PMAD operation, a PADD operation, the PSUB operation, and a PSUBS operation, a PMAX operation, and a PMIN operation, respectively. These operations may be performed as part of a microcode sequence to implement the PSAD instruction 160, for example.

In one embodiment, a PSAD instruction receives packed byte data D having eight packed data elements Di and packed byte data E having eight packed data elements Ei and computes scalar result R according to the formula:

$$R = \sum_{i=0}^{7} |D_i - E_i|$$

Figure 5:
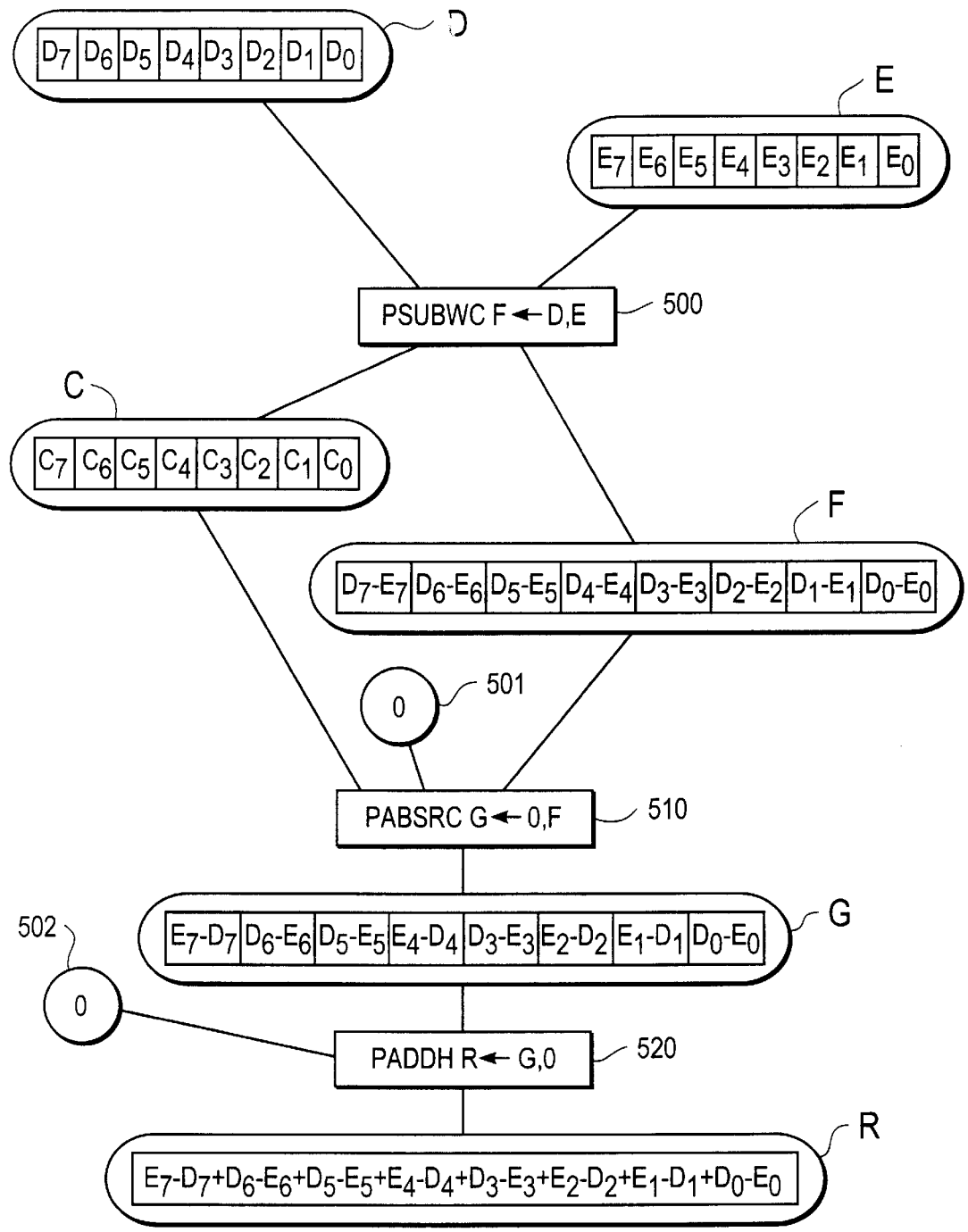
FIG. 5 illustrates a first embodiment of a Packed Sum of Absolute Differences (PSAD) instruction of the present invention.

FIG. 5 illustrates a first embodiment of the PSAD instruction 160.

In step 500, the first operation is a packed subtract and write carry (PSUBWC) operation. For example, in a PSUBWC F←D, E operation, each packed data element Fi of the packed byte data F is computed by subtracting the packed data element Ei of the packed byte data E from the corresponding packed data element Di of the packed byte data D. Each packed data element in the packed byte data D, E, and F represent an unsigned integer. Each carry bit Ci of a set of carry bits C is stored. Each carry bit Ci indicates the sign of the corresponding packed data element Fi.

In step 510, the second operation is a packed absolute value and read carry (PABSRC) operation. For example, in a PABSRC G←0, F operation, each packed data element Gi of a packed byte data G is computed by adding a packed data element Fi of the packed byte data F to a zero 501 (if the carry bit Ci indicates the corresponding packed data element Fi is non-negative) and subtracting the packed data element Fi from the zero 501 (if the carry bit Ci indicates the corresponding packed data element Fi is negative).

In one embodiment, step 500 and step 510 are performed as described with reference to FIGS. 9 and 10.

In step 520, the third operation is a packed add horizontal (PADDH) operation. For example, in a PADDH R←G, 0 operation, a PMA circuit is used to produce the result RS (an example of which is shown as 1200 in FIG. 12) having a field 1222 that represents the sum of all of the packed data elements of packed byte data G as described with reference to FIGS. 11, 12 and 13 below. The PADDH operation is also referred to as a horizontal addition operation.

Figure 6:
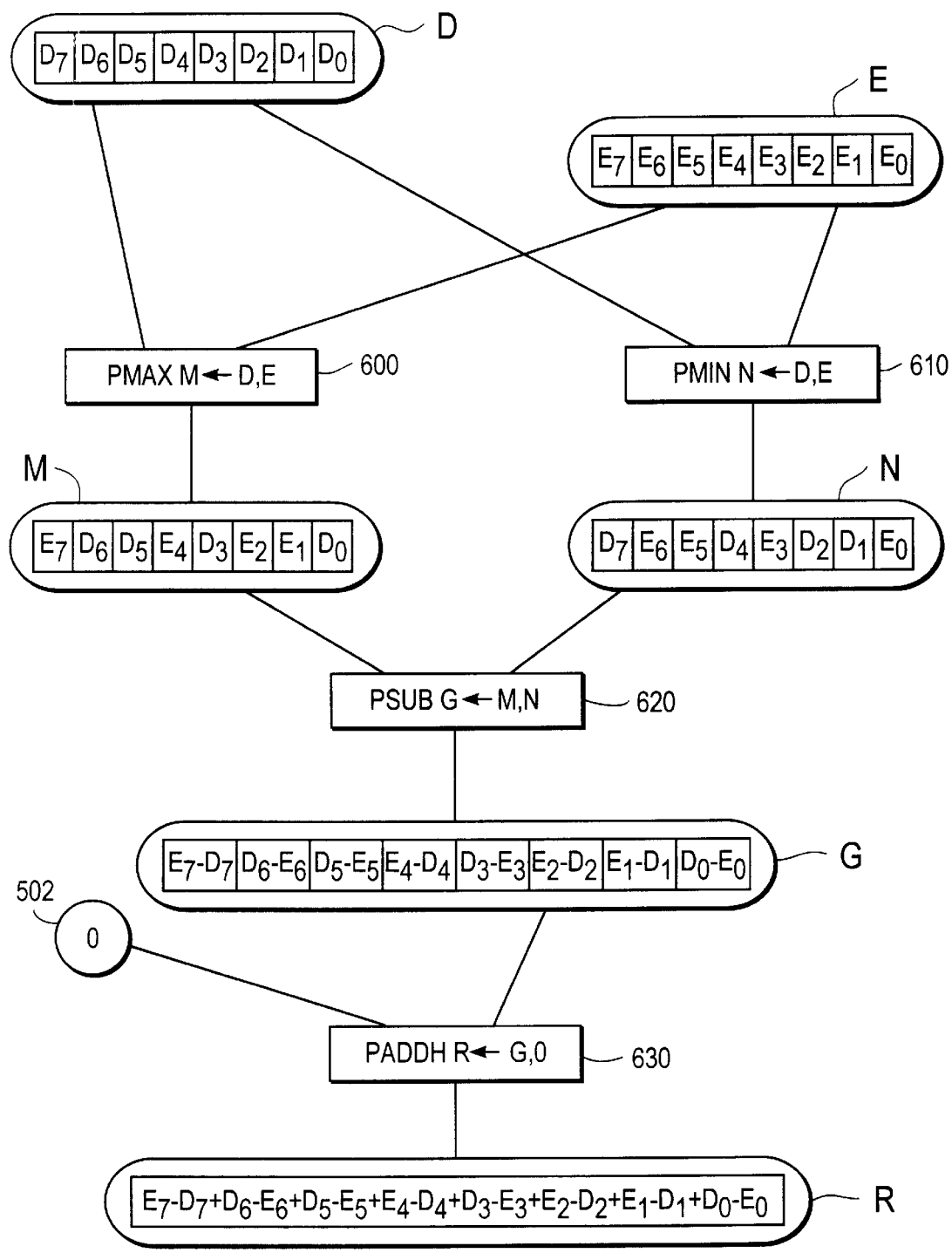
FIG. 6 illustrates a second embodiment of the PSAD instruction of the present invention.
Figure 7:
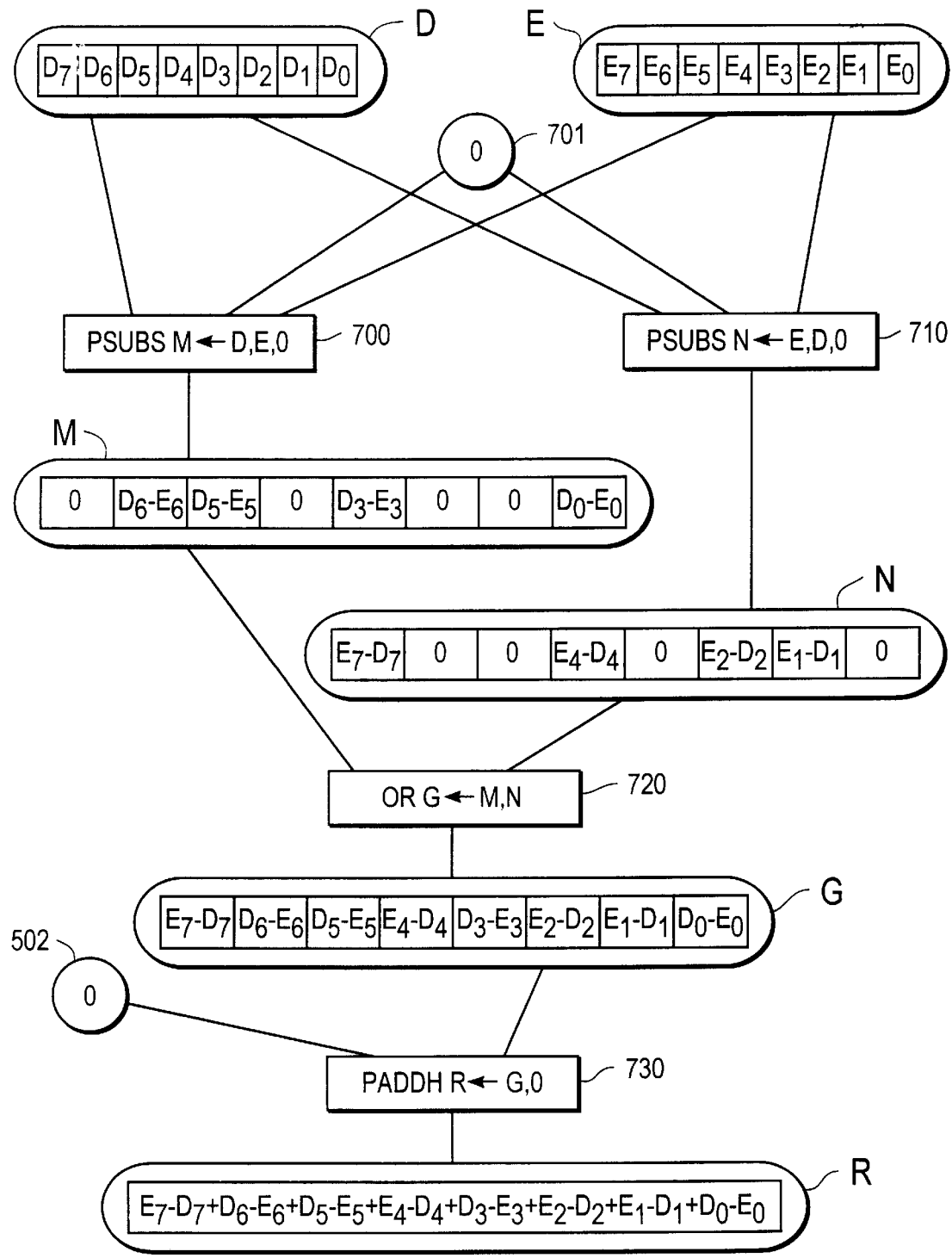
FIG. 7 illustrates a third embodiment of the PSAD instruction of the present invention.

These operations may be used to perform other instructions. For example, the PSUBWC and PABSRC operations may be used to perform a packed absolute difference (PAD) instruction that produces a packed byte data having packed data elements that are the absolute differences of the packed data elements Di and Ei. A PSAD instruction may be implemented using the PADDH operation in combination with numerous other methods to produce a PAD. FIGS. 6 and 7 below illustrate two examples. Furthermore, the PADDH operation may be used as a PADDH operation to sum the packed data elements of the packed byte data D where D is a packed byte data other than a PAD. For example, D may be any packed byte data for which a sum of the packed data elements of the packed byte data D is desired.

FIG. 6 illustrates a second embodiment of the PSAD instruction 160.

In step 600, the PMAX operation is used. In a PMAX M←D,E instruction, each packed data element Mi of packed byte data M is the maximum value of the packed data element Di of the packed byte data D and the packed data element Ei of the packed byte data E.

In step 610, the PMIN operation is used. In a PMIN N←D,E operation each packed data element Ni of the packed byte data N is the minimum value of the packed data element Di of the packed byte data D and the packed data element Ei of the packed byte data E.

In step 620, the PSUB operation is used. In a PSUB G←M,N operation, each packed data element Gi of the packed byte data G is computed by subtracting the packed data element Ni of the packed byte data N from the packed data element Mi of the packed byte data M.

In step 630, the PADDH operation is used. In the PADDH R←G,0 operation, all of the packed data elements of the packed byte data G are summed together to produce a result R as described in step 520 of FIG. 5.

FIG. 7 illustrates a third embodiment of the PSAD instruction 160.

In step 700, the PSUBS operation is used. In the PSUBS M←D,E operation, each packed data element Mi of the packed byte data M is computed by subtracting a packed data element Ei of the packed byte data E from a packed data element Di of the packed byte data D, saturated at zero. If the result of the subtraction is less than zero, the packed data element Mi is set to zero (saturated). Otherwise, the packed data element Mi is the result of the subtraction.

In step 710, the PSUBS operation is used. In the PSUBS N←D,E operation, each packed data element Ni of the packed byte data N is computed by subtracting a packed data element Di of the packed byte data D from a packed data element Ei of the packed byte data E, saturated at zero In step 720, a bitwise OR operation is used. In the bitwise OR G←M,N operation, each packed data element Gi of the packed byte data G is computed as the bitwise OR of packed byte data M and packed byte data N. In cases where the packed data element Di is greater than the packed data element Ei, the packed data element Mi is the packed data element Di minus the packed data element Ei and the packed data element Ni is zero. The bitwise OR of the packed data element Mi and the packed data element Ni is the packed data element Di minus the packed data element Ei. In cases where the packed data element Di is less than packed data element Ei, the packed data element Mi is zero and the packed data element Ni is the packed data element Ei minus the packed data element Di. The bitwise OR of packed data element Mi and the packed data element Ni is the packed data element Ei minus the packed data element Di. In cases where the packed data element Di is equal to the packed data element Ei, the packed data element Mi and the packed data element Ni are zero. The bitwise OR of the packed data element Mi and the packed data element Ni is zero.

In step 720, the PADDH operation is used. In the PADDH R←G,0 operation, all of the packed data elements of the packed byte data G are summed together to produce a result R as described in step 520 of FIG. 5.

The examples in FIGS. 6 and 7 include the PADDH operation in combination with other operations. It will be apparent to one skilled in the art that the PADDH operation may be implemented as an instruction and used with the instructions of the packed data set 145, for example.

Figure 8:
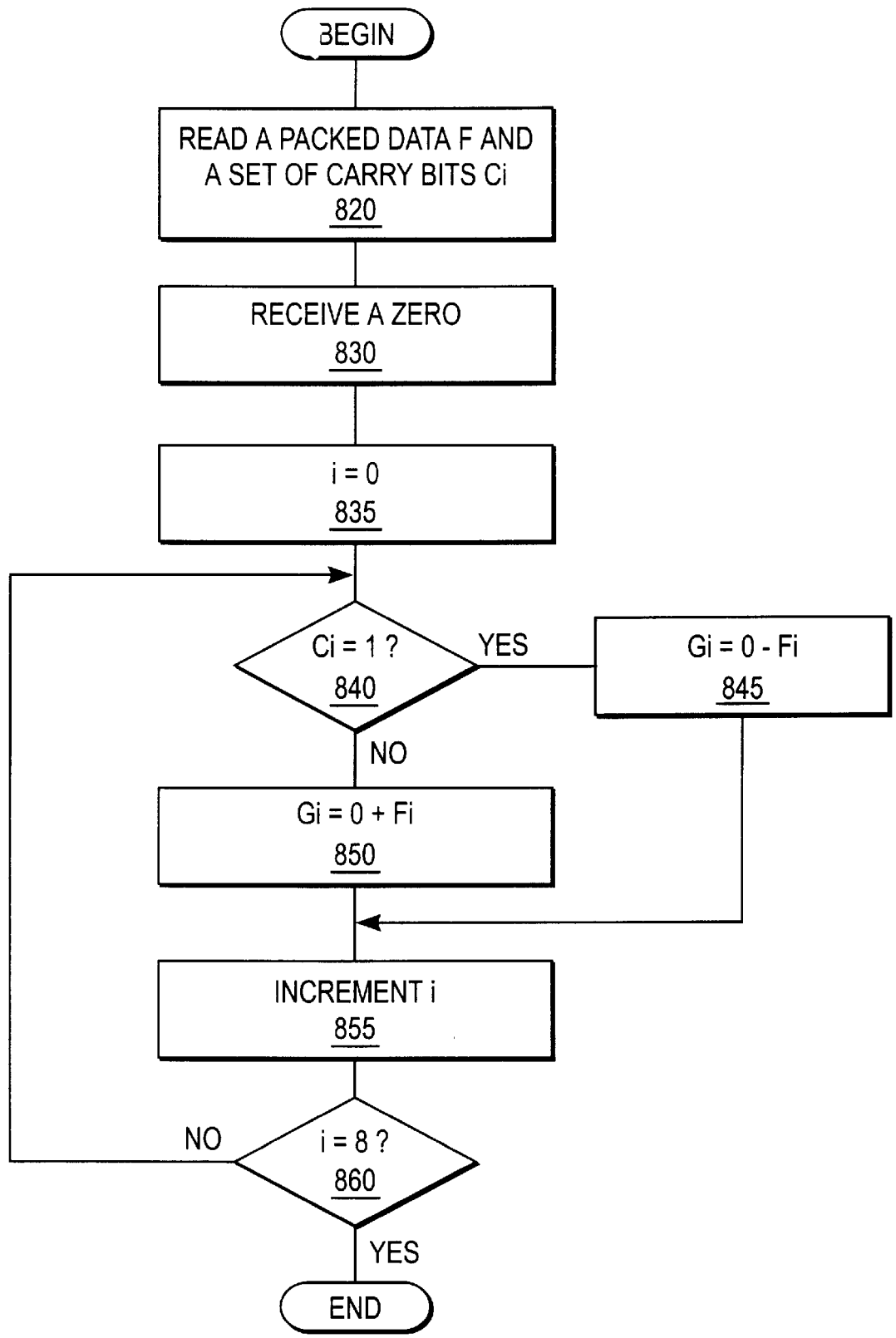
FIG. 8 illustrates an embodiment of the PABSRC operation of the present invention.

FIG. 8 illustrates an embodiment of the PABSRC operation of the present invention.

In step 820, the packed byte data F and a set of carry bits C ($C_0$ . . . $C_7$) are read. In an alternate embodiment, the packed byte data F and a set of sign bits S ($S_0$ . . . $S_7$) are read.

In step 830, a zero is received.

In step 835, a counter i is set to zero.

In step 840, a determination is made whether Fi is negative. In one embodiment, the carry bit Ci corresponding to packed data element Fi is compared with one. If the carry bit Ci is equal to one, step 845 is performed. If the carry bit Ci is not equal to one, step 850 is performed. In another embodiment, the sign bit Si corresponding to packed data element Fi is compared with one. If the sign bit Si is equal to one, step 845 is performed. If the sign bit Si is not equal to one, step 850 is performed.

In step 845, the packed data element Gi of packed byte data G is computed as 0−Fi. Thus, the negative value of Fi is negated to produce the absolute value of Fi. Step 855 is then performed.

In step 850, the packed data element Gi of packed byte data G is set to equal the packed data element Fi. Thus, the non-negative value of Fi is unmodified to produce the absolute value of Fi.

In step 855, the counter i is incremented by one.

In step 860, the counter i is tested against the number of packed data elements in a packed byte data. In one embodiment, there are 8 packed data elements in a packed byte data. If the counter i does not equal 8, step 840 is performed. If the counter i equals 8, the PABSRC operation is completed.

FIG. 8 illustrates each packed data element Gi of packed byte data G being computed serially. However, in the preferred embodiment, each packed data element Gi of packed data G is computed in parallel.

Figure 9:
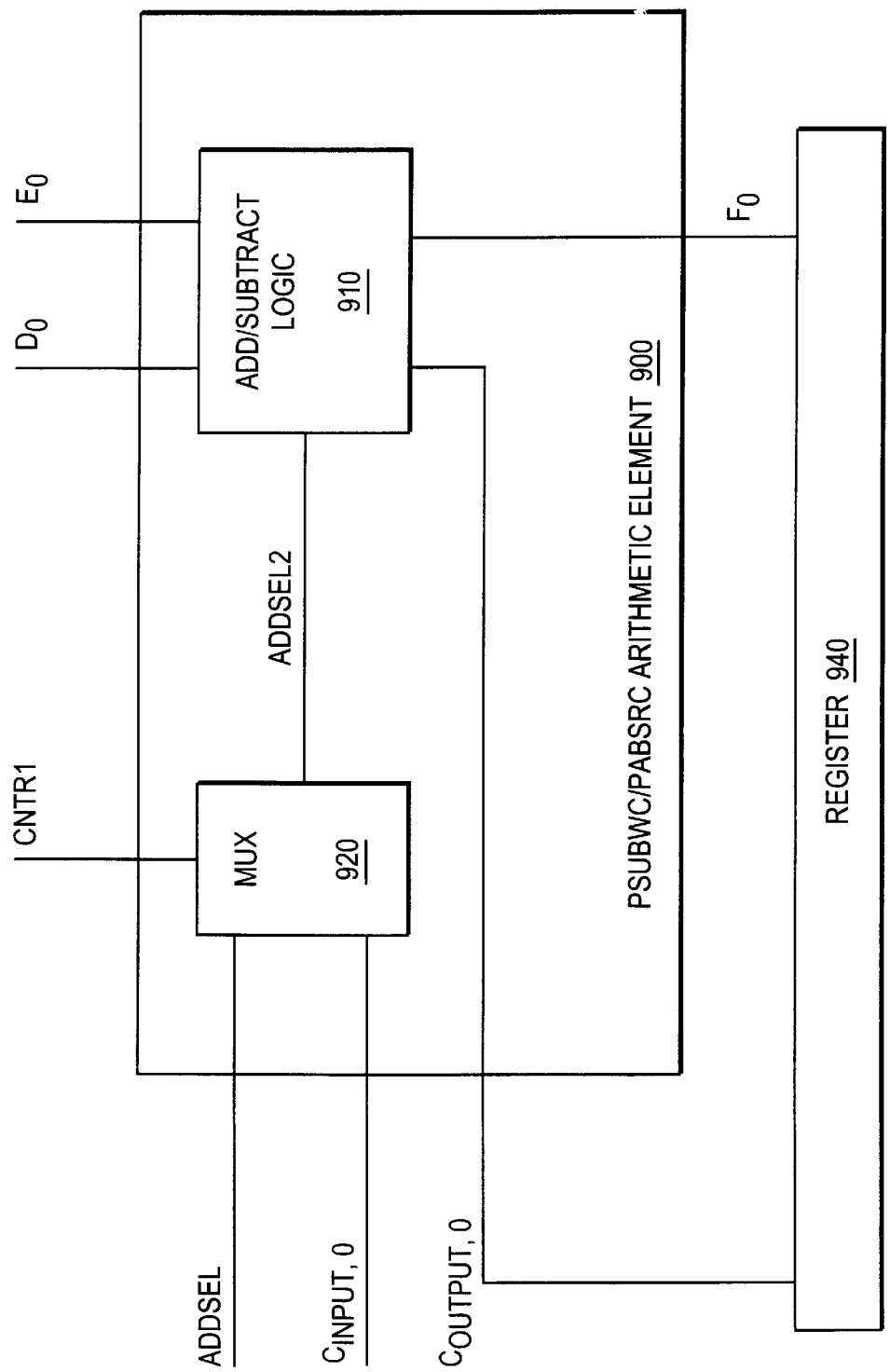
FIG. 9 illustrates one embodiment of a packed subtract and write carry/packed absolute value and read carry (PSUBWC/PABSRC) arithmetic element of the present invention.

FIG. 9 illustrates one embodiment of a PSUBWC/PABSRC arithmetic element of the present invention.

In one embodiment, a PSUBWC/PABSRC arithmetic element described below is used for each of the packed data elements in a packed byte data.

A PSUBWC/PABSRC arithmetic element 900 comprises an add/subtract logic 910 and a mux 920. The add/subtract logic 910 is coupled to receive a packed data element $D_0$ of the packed byte data D, a packed data element $E_0$ of the packed byte data E, and an add/subtract select control 2 (ADDSEL2) signal. The add/subtract logic 910 generate a carry output bit on the $C_{output,0}$ bus and a packed data element $F_0$ of the packed byte data F on the $F_0$ bus.

The mux 920 is coupled to receive the add/subtract control (ADDSEL) signal, and the carry input bit $C_{input,0}$ on the $C_{input,0}$ bus.

A register 940 is coupled to the $C_{output,0}$ bus and the $F_0$ bus.

When performing a PSUBWC operation, the ADDSEL signal indicates a subtract operation. The control signal CNTR1 is asserted to route the ADDSEL signal through the mux 920 to produce the ADDSEL2 signal. The ADDSEL2 signal indicates a subtract operation. The add/subtract logic 910 produces a packed data element $F_0$ that is computed as the packed data element $D_0$ minus the packed data element $E_0$. The packed data element $F_0$ is stored in a portion of the register 940. The add/subtract logic 910 also produces carry output bit $C_{output,0}$ that is the carry output of the subtraction of packed data element $E_0$ from the packed data element $D_0$ and the carry output bit $C_{output,0}$ is stored in a portion of register 940. The $C_{output,0}$ signal is a one if the result of the subtract operation is negative and a zero is the result of the subtract operation is non-negative.

When performing a PABSRC operation, the register 940 is read to produce the $C_{input,0}$ signal. The control signal CNTR1 is deasserted to route the $C_{input,0}$ signal through the mux 920 to produce the ADDSEL2 signal. The ADDSEL2 signal indicates an add or subtract operation depending on the value of the $C_{input,0}$ signal. The packed data elements of packed byte data D are set to zero. The add/subtract logic 910 produces the packed data element $F_0$ that is the sum of the packed data element $D_0$ (zero) and the packed data element $E_0$, if the carry input bit $C_{input,0}$ is a zero. The add/subtract logic 910 produces a packed data[]element $F_0$ that is the packed data element $D_0$ (zero) minus the packed data element $E_0$, if the carry input bit $C_{input,0}$ is a one. The packed data element $F_0$ is stored in a portion of the register 940.

In one embodiment, the PSUBWC/PABSRC arithmetic element 900 is the same circuitry used to perform the PADD instruction 151. The mux 920 is added and the $C_{output,0}$ bus is routed to the register 940 and the $C_{input,0}$ bus is routed to the mux 920 to provide for the PSAD instruction 160.

By saving the carry bits from the PSUBWC operation and using the saved carry bits to control the subsequent PABSRC operation, the same circuitry used to perform the PADD hardware may be used to perform both the PSUBWC and the PABSRC operations with relatively little additional circuitry.

Figure 10:
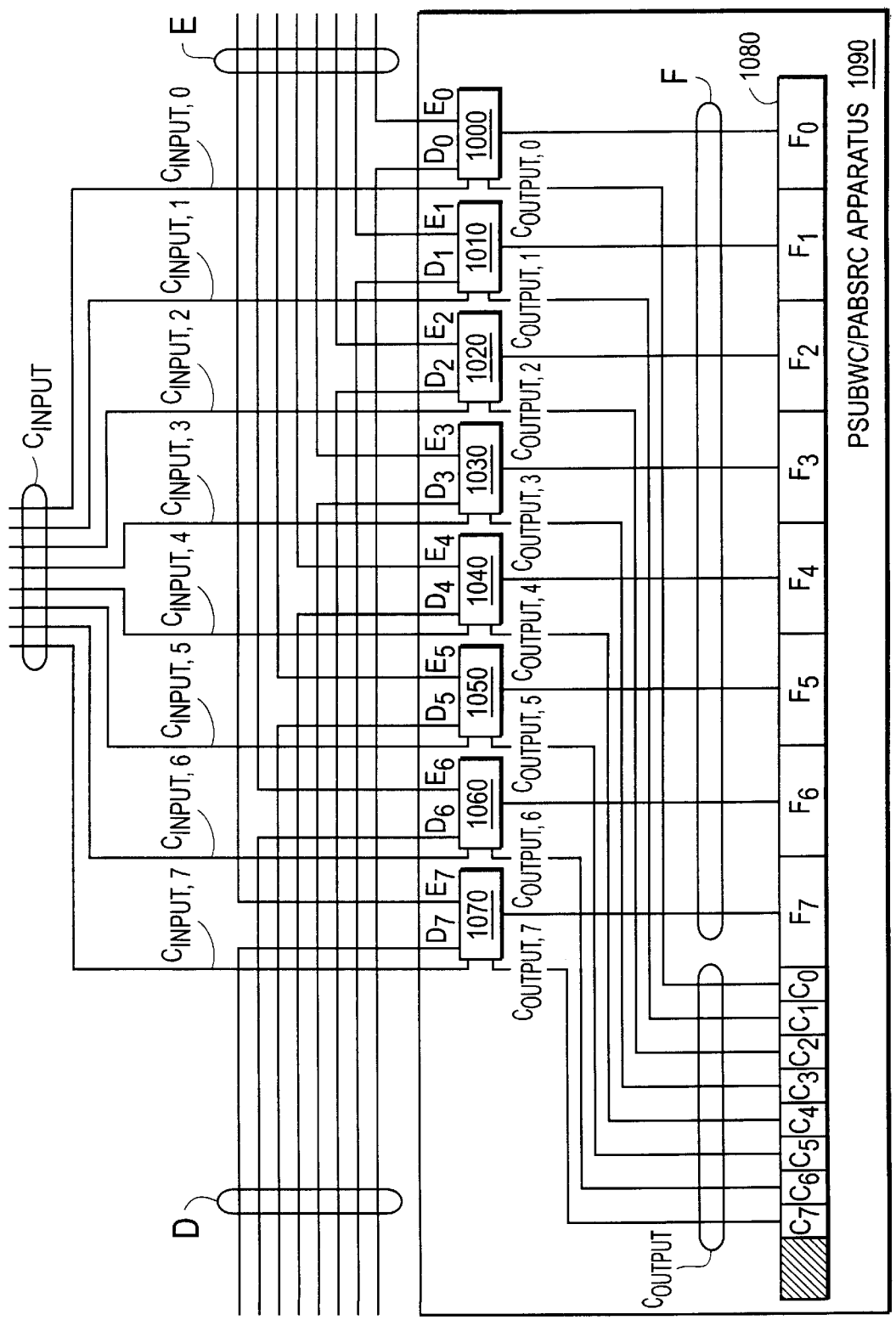
FIG. 10 illustrates one embodiment of a PSUBWC/PABSRC apparatus of the present invention.

FIG. 10 illustrates one embodiment of a PSUBWC/PABSRC apparatus of the present invention.

A PSUBWC/PABSRC apparatus 1090 is coupled to a D bus having packed data elements $D_0$, $D_1$, $D_2$, $D_3$, $D_4$, $D_5$, $D_6$, and $D_7$, an E bus having packed data elements $E_0$, $E_1$, $E_2$, $E_3$, $E_4$, $E_5$, $E_6$, and $E_7$ and a $C_{input}$ bus having carry input bits $C_{input,0}$, $C_{input,1}$, $C_{input,2}$, $C_{input,3}$, $C_{input,4}$, $C_{input,5}$, $C_{input,6}$, and $C_{input,7}$. The PSUBWC/PABSRC apparatus 1090 is configured to drive a $C_{output}$ bus includes carry output bits $C_{output,0}$, $C_{output,1}$, $C_{output,2}$, $C_{output,3}$, $C_{output,4}$, $C_{output,5}$, $C_{output,6}$, and $C_{output,7}$ and a result (F) bus includes packed data elements $F_0$, $F_1$, $F_2$, $F_3$, $F_4$, $F_5$, $F_6$, and $F_7$. A register 1080 is coupled to the $C_{output}$ bus and the F bus.

The PSUBWC/PABSRC apparatus 1090 includes PSUBWC/PABSRC arithmetic elements coupled to receive packed data elements and carry input bits and generate packed data elements and carry output bits as shown below in Table 1.

TABLE 1

| PSUBWC/PABSRC arithmetic element | Packed Data elements | $C_{input.i}$ | $C_{output.i}$ | Packed Data element |
|---|---|---|---|---|
| 1000 | $D_0$ and $E_0$ | $C_{input\ 0}$ | $C_{output\ 0}$ | $F_0$ |
| 1010 | $D_1$ and $E_1$ | $C_{input\ 1}$ | $C_{output\ 1}$ | $F_1$ |
| 1020 | $D_2$ and $E_2$ | $C_{input\ 2}$ | $C_{output\ 2}$ | $F_2$ |
| 1030 | $D_3$ and $E_3$ | $C_{input\ 3}$ | $C_{output\ 3}$ | $F_3$ |
| 1040 | $D_4$ and $E_4$ | $C_{input\ 4}$ | $C_{output\ 4}$ | $F_4$ |
| 1050 | $D_5$ and $E_5$ | $C_{input\ 5}$ | $C_{output\ 5}$ | $F_5$ |
| 1060 | $D_6$ and $E_6$ | $C_{input\ 6}$ | $C_{output\ 6}$ | $F_6$ |
| 1070 | $D_7$ and $E_7$ | $C_{input\ 7}$ | $C_{output\ 7}$ | $F_7$ |

In one embodiment, the PSUBWC/PABSRC apparatus 1090 is the same circuitry used to perform the PADD instruction 151. The register 1080 may be an 80-bit floating point register. In this example, when the 64 least significant bits are used to store a 64-bit packed byte data, eight of the sixteen most significant bits are used to store the set of carry bits on the $C_{output}$ bus.

Figure 11:
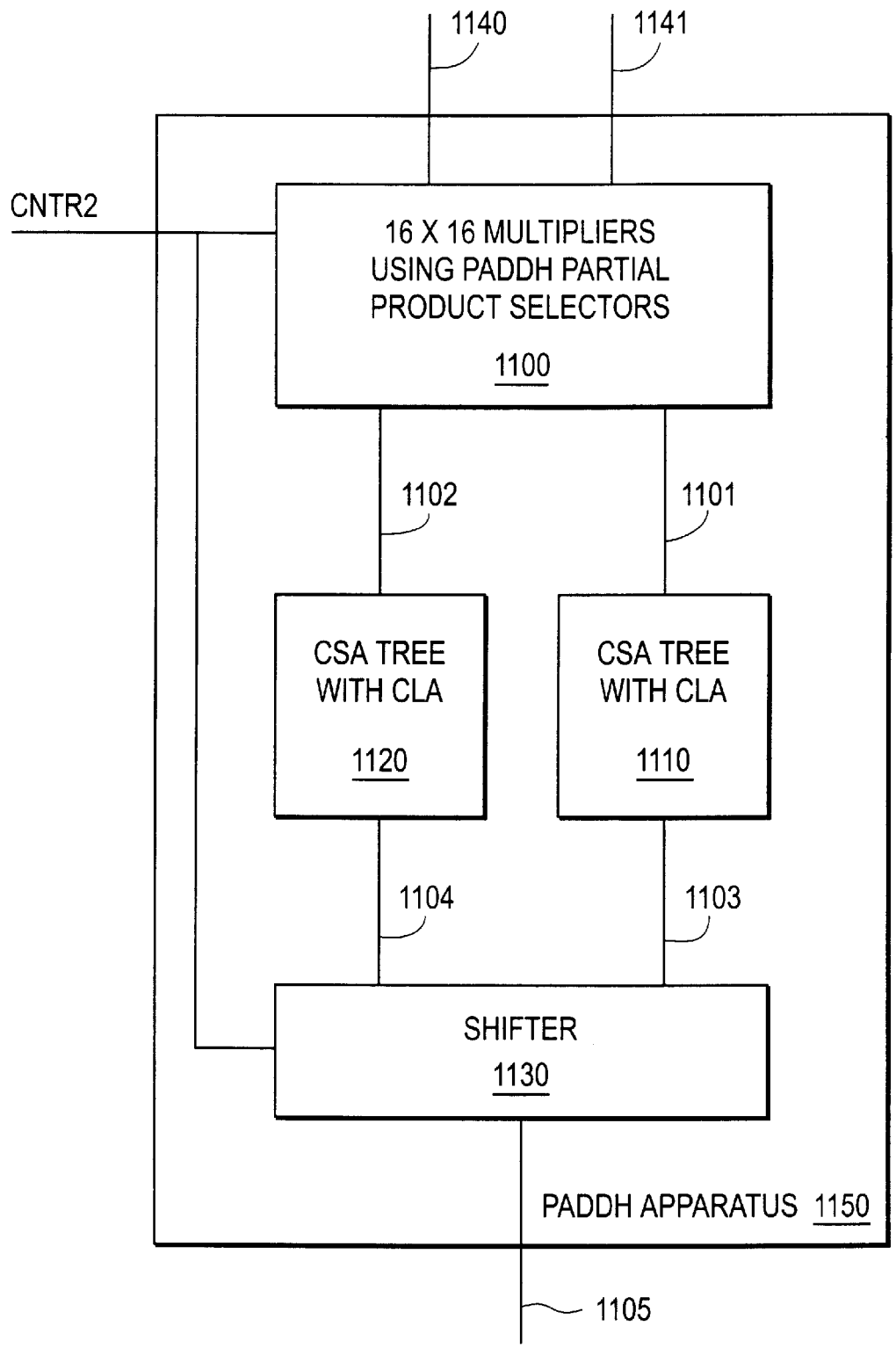
FIG. 11 illustrates one embodiment of a packed horizontal add (PADDH) apparatus of the present invention.

FIG. 11 illustrates one embodiment of a PADDH apparatus of the present invention. A set of 16×16 multipliers 1100 is coupled to receive a CNTR2 signal, a first operand on a bus 1140 and a second operand on a bus 1141.

When the CNTR2 signal is deasserted, a PADDH apparatus 1150 performs the PMAD instruction 150. The set of 16×16 multipliers 1100 multiply each packed data element Ai of the packed word data A received on the bus 1140 with the corresponding packed data element Bi of the packed word data B received on the bus 1141 to produce thirty-two 18-bit partial products using radix 4 multiplication. The eight partial products corresponding to the product of $A_0$ and $B_0$ and the eight partial products corresponding to the product of $A_1$ and $B_1$ (the first sixteen partial products) are produced on a bus 1101. The eight partial products corresponding to the product of $A_2$ and $B_2$ and the eight partial products corresponding to the product of $A_3$ and $B_3$ (the second sixteen partial products) are produced on a bus 1102.

In one embodiment, the set of 16×16 multipliers 1100 use multiple partial product selectors employing Booth encoding to generate partial products. Each partial product selector receives a portion of the multiplicand and a portion of the multiplier and generates a portion of a partial product according to well-known methods.

A carry-save adder (CSA) tree with carry lookahead adder (CLA) 1110 is coupled to receive the first sixteen partial products on the bus 1101 and generate the sum of the first sixteen partial products on a bus 1103. The sum of the first sixteen partial products on the bus 1103 is the sum of the product of $A_0$ and $B_0$ and the product of $A_1$ and $B_1$. The CSA tree with CLA 1120 is coupled to receive the second sixteen partial products on the bus 1102 and generate the sum of the second sixteen partial products on a bus 1104. The sum of the second sixteen partial products on the bus 1103 is the sum of the product of $A_2$ and $B_2$ and the product of $A_3$ and $B_3$.

A shifter 1130 is configured to receive the sum on the bus 1103, the sum on the bus 1104, and the CNTR2 signal and generate the packed dword data T on a bus 1105. When the CNTR2 signal is deasserted, the shifter 1130 passes the dword on the bus 1104 onto the most significant dword of the bus 1105 (corresponding to the packed data element $T_1$) and the dword on the bus 1103 onto the least significant dword of the bus 1105 (corresponding to the packed data element $T_0$). The data element $T_0$ is the sum of the product of $A_0$ and $B_0$ and the product of $A_1$ and $B_1$ and the packed data element $T_1$ is the sum of the product of $A_2$ and $B_2$ and the product of $A_3$ and $B_3$. Thus, when the CNTR2 signal is deasserted, the PADDH apparatus 1150 performs the PMAD instruction 150.

In one embodiment, the PADDH operation receives a packed byte data G on the bus 1140 and a packed byte data Z on the bus 1141 in which packed data Z has the packed data elements set to zero. The CNTR2 signal is asserted.

When the CNTR2 signal is asserted, certain partial product selectors (PADDH partial product selectors) within the set of 16×16 multipliers 1100 are configured to insert each packed data element Gi into a portion of one of the first sixteen partial products. The four least significant bytes of packed byte data G, $G_0$, $G_1$, $G_2$, and $G_3$, are produced in portions of four of the first sixteen partial products using the PADDH partial product selectors. These four partial products are four of the eight partial products generated for the product of $A_0$ and $B_0$ as described above in the case of performing the PMAD instruction 150. The four most significant bytes of packed byte data G, $G_4$, $G_5$, $G_6$, and $G_7$, are produced in portions of four of the first sixteen partial products using the PADDH partial product selectors. These four partial products are four of the eight partial products generated for the product of $A_1$ and $B_1$ as described above in the case of performing the PMAD instruction 150. The portions of the eight selected partial products of the first sixteen partial products and all the bit positions of the remaining partial products on the bus 1101 and the bus 1102 are generated (using prior art partial product selectors or PADDH partial product selectors, for example) as described in the case of the CNTR2 signal being deasserted. The portions of the eight selected partial products of the first sixteen partial products and all the bit positions of the remaining partial products on the bus 1101 and the bus 1102 evaluate to be zero since the multipliers (packed data elements of the packed byte data Z) are zero. The PADDH partial product selector and its configuration within a CSA tree with CLA is described with reference to FIGS. 12 and 13.

The CSA tree with CLA 1110 is coupled to receive the first sixteen partial products on the bus 1101 and generate the sum of the first sixteen partial products on the bus 1103. The sum of the first sixteen partial products on the bus 1103 includes the sum all of the packed data elements of the packed data G in a field within the result (see FIG. 12). A CSA tree with CLA 1120 is coupled to receive the second sixteen partial products on the bus 1102 and generate the sum of the second sixteen partial products on the bus 1103. The sum of the second sixteen partial products on the bus 1103 is zero.

A shifter 1130 is configured to receive a result RS having a least significant dword sum on the bus 1103 and a most significant dword sum on the bus 1104 and generate the result R on the bus 1105. The result R includes a field representing the sum all of the packed data elements of packed byte data G. The shifter 1130 performs a right shift operation on the result RS to produce the result R having the field representing the sum all of the packed data elements of packed byte data G aligned with the least significant bit of the result R. In one embodiment, a right shift of RS (e.g., 1200 shown in FIG. 12) by 10 bits is used to generate the result R. Thus, when the CNTR2 signal is asserted and all of the packed data elements of packed byte data Z are set to zero, the PADDH apparatus 1150 performs a PADDH operation.

In one embodiment, the shifter 1130 is a barrel shifter. In another embodiment, the shifter 1130 is a special purpose shifter configured to pass the input data to the output without shifting the input data (in response to the CNTR2 signal being deasserted for a PMAD instruction 150, for example) or shift the field representing the sum all of the packed data elements of packed byte data G to be aligned with the least significant bit of the output (in response to the CNTR2 signal being asserted for the PADDH operation, for example).

In one embodiment, the CSA with CLA 1110 and the CSA with CLA 1120 is a CSA adder tree with a CLA at the final stage of the tree. However, it will be apparent to one skilled in the art that other configurations of adder trees may be used to sum multiple partial products and implement the PADDH operation according to the present invention.

Figure 12:
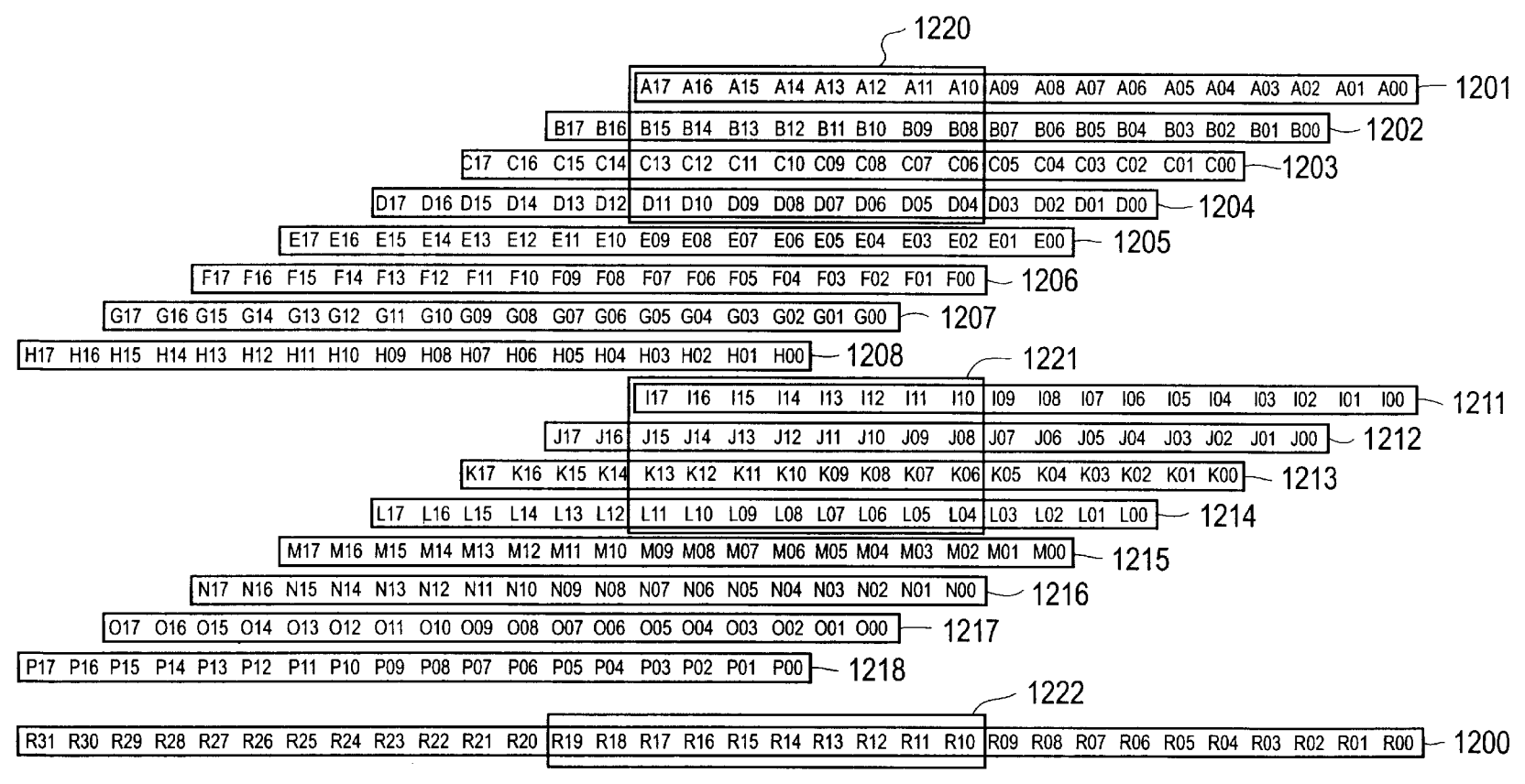

FIG. 12 illustrates the alignment of the first sixteen partial products in the CSA tree with CLA 1110 according to one embodiment.

A partial product 1201 having bits A00–A17, a partial product 1202 having bits B00–B17, a partial product 1203 having bits C00–C17, a partial product 1204 having bits D00–D17, a partial product 1205 having bits E00–E17, a partial product 1206 having bits F00–F17, a partial product 1207 having bits G00–G17, a partial product 1208 having bits H00–H17, a partial product 1211 having bits I00–I17, a partial product 1212 having bits J00–J17, a partial product 1213 having bits K00–K17, a partial product 1214 having bits L00–L17, a partial product 1215 having bits M00–M17, a partial product 1216 having bits N00–N17, a partial product 1217 having bits O00–O17, and a partial product 1218 having bits P00–P17 are added together in the CSA tree 1210 to produce a result 1200 having bits R00–R31.

The PADDH partial product selectors are configured to insert the packed data element $G_0$ at A10–A17, the packed data element $G_1$ at B08–B15, the packed data element $G_2$ at C06–C13, the packed data element $G_3$ at D04–D11, the packed data element $G_4$ at I10–I17, the packed data element $G_5$ at J08–J15, the packed data element $G_6$ at K06–K13, and the packed data element $G_7$ at L04–L11. The remaining partial product selectors produce bits having the value of the partial products resulting from the multiplication. Since, the multiplier is selected to be zero, all the bits of all the partial products are zero except within a field 1220 and a field 1221 in which the packed data elements of the packed byte data G are inserted.

In one embodiment, each bit within a field 1222 of the result 1200 is computed as follows. R10 is computed as the sum of A10, B08, C06, D04, E02, F00, I10, J08, K06, L04, M02, and N00. R11 is computed as the sum of A11, B09, C07, D05, E03, F01, I11, J09, K07, L05, M03, N01 and the catty output of the sum of A10, B08, C06, D04, E02, F00, I10, J08, K06, L04, M02, and N00. R12–R19 are computed similarly.

In one embodiment, the CSA tree with CLA 1120 does not contain PADDH partial product selectors. The sum of the second sixteen partial products is zero since the packed data elements of packed byte data Z received on bus 1141 of multipliers 1100 are set to zero during the PADDH operation and none of the packed data elements of packed data D are inserted into the second sixteen partial products.

The shifter 1130 receives the most significant dword of the result RS on the bus 1104 (all zeroes) and the least significant dword of the result RS on the bus 1103. The result RS includes the field 1222 that represents the sum of the packed data elements $G_0$, $G_1$, $G_2$, $G_3$, $G_4$, $G_5$, $G_6$, and $G_7$. The shifter 1130 performs a right shift of the result RS by 10 bits to produce the result R having the field that represents the sum of the packed data elements $G_0$, $G_1$, $G_2$, $G_3$, $G_4$, $G_5$, $G_6$, and $G_7$ aligned with the least significant bit of the result R. The result R is produced on the bus 1105.

In an alternate embodiment, the packed data elements of the packed byte data G are added together in the CSA with CLA 1120 and a right shift operation of the result RS by 42 bits is used to generate the result R.

In yet another embodiment, the packed data elements of packed byte data G are added together in the CSA with CLA 1110 and the packed data elements of packed byte data F are added together in the CSA with CLA 1120 to produce the result RS having a first field (in the most significant dword of the result RS) containing the sum of the packed data elements of packed byte data G and a second field (in the least significant dword of the result RS) containing the sum of the packed data elements of packed byte data F. A right shift operation on the result RS may be used to align each field with the least significant bit of the corresponding dword of the result R.

It will be apparent to one skilled in the art that the packed data elements may be inserted in numerous locations depending on factors such as the number of packed data elements to be inserted, the size of the packed data elements to be inserted, the size of the partial products and the number of the partial products. For example, four additional packed data elements may be inserted at bits E02–E09 of the partial product 1205, bits F00–F07 of the partial product 1206, bits M02–M09 of the partial product 1215, and bits N00–N07 of the partial product 1216 to be summed with the eight packed data elements in the field 1220 and the field 1221 as illustrated in FIG. 12. In another example, the eight packed data elements may be inserted at bits B13–B06 of the partial product 1202, bits C11–C04 of the partial product 1203, bits D09–D02 of the partial product 1204, and bits E07–E00 of the partial product 1205, bits J13–J06 of the partial product 1212, bits K11–K04 of the partial product 1213, bits L09–L02 of the partial product 1214, and bits M07–M00 of the partial product 1215. The result RS has the field 1222 at bits R08–R17 of the result 1200.

Figure 13:
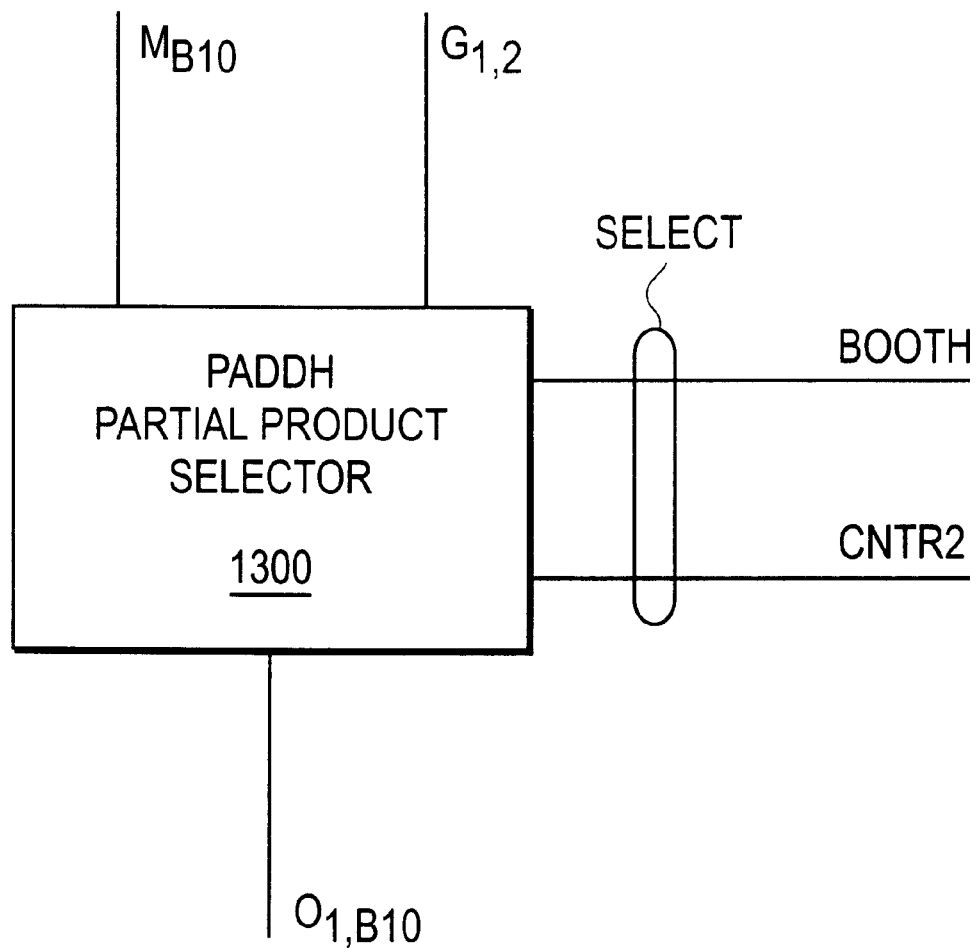
FIG. 13 illustrates one embodiment of a PADDH partial products selector of the present invention.

FIG. 13 illustrates one embodiment of a PADDH partial product selector of the present invention.

The following example illustrates a partial product selector used to generate bit B10 of the partial product 1202 and insert bit 2 of a packed data element $G_1$ of a packed byte data G at bit B10 of the partial product 1202 when performing a PADDH operation.

A PADDH partial product selector 1300 is coupled to receive an $M_{B10}$ signal, a $G_{1,2}$ signal, and a SELECT signal, and generate an $O_{1,B10}$ signal. The SELECT signal includes a booth encoding (BOOTH) control signal and an additional control (CTRL2) signal. The $M_{B10}$ signal represents the booth encoded multiplicand bits corresponding bit B10 of the partial product 1202. The BOOTH signal represents a portion of the multiplier. The $G_{1,2}$ signal represents bit 2 of a packed data element $G_1$ of a packed data G for the PADDH operation.

When the CTRL2 signal is not asserted, the PADDH partial product selector 1300 receives the the $M_{B10}$ signal and produces bit B10 of the partial product 1202 by selecting one of the bits of the $M_{B10}$ signal to be driven on the $O_{1,2}$ signal according to the well-known booth encoding method.

When the CTRL2 signal is asserted, the PADDH partial product selector 1300 receives the $G_{1,2}$ signal and drives the $O_{1,2}$ signal to the same value to insert bit 2 of the packed data element $G_1$ of the packed data G into bit B10 of the partial product 1202. By using multiple PADDH partial product selectors, all the bits of the packed data element $G_1$ may be inserted into the partial product 1202. Furthermore, other packed data elements may be inserted into other partial products using more PADDH partial product selectors.

In one embodiment, the PADDH partial product selector 1300 is a standard partial product selector (the BOOTH signal) with an extra control signal (the CNTR2 signal) to select between the standard input (the $M_{B10}$ signal) and an extra input (the $G_{1,2}$ signal). Thus, there is little incremental logic needed to implement the PADDH operation.

What is claimed is:

1. A method comprising:
   producing a plurality of partial products in a multiplier having a plurality of partial product selectors;
   inserting each element of a first plurality of elements of a first packed data into bit positions of one or more of the plurality of partial products by using partial product selectors corresponding to the bit positions; and
   adding the first plurality of elements together to produce a first result including a field comprising a sum of the first plurality of elements, said field having a least significant bit.

2. The method of claim 1 further comprising shifting the first result to produce a second result having a least significant bit position and to align the least significant bit of the field with the least significant bit position of the second result.

3. The method of claim 1 wherein the first plurality of elements consists of eight elements, each of the first plurality of elements being an unsigned byte.

4. The method of claim 1 wherein the multiplier has zero as one operand.

5. The method of claim 1 further comprising:
   producing a fourth packed data having a fourth plurality of elements and a plurality of sign indicators, each of the fourth plurality of elements and the plurality of sign indicators being computed by subtracting one of a second plurality of elements of a second packed data from a corresponding one of a third plurality of elements of a third packed data; and
   producing the first packed data, each of the first plurality of elements being computed either by
   subtracting one element of the fourth plurality of elements from one number of one or more numbers if the sign indicator corresponding to that one element is in a first state, or by
   adding one element of the fourth plurality of elements to one number of one or more numbers if the sign indicator corresponding to that one element is in a second state.

6. The method of claim 5 wherein the sign indicator corresponding to one element of the fourth plurality of elements is a carry bit corresponding to that one element.

7. The method of claim 5 wherein the sign indicator corresponding to one element of the fourth plurality of elements is a plurality of bits encoding a sign of that one element.

8. The method of claim 5 wherein the sign indicator corresponding to one element of the fourth plurality of elements is a circuit configuration of a corresponding arithmetic circuit configurable to add or subtract that one element with one or more numbers comprising a number equal to zero.

9. The method of claim 1 further comprising:
   producing a fourth packed data having a fourth plurality of elements, each of the fourth plurality of elements being maximum value of one of a second plurality of elements of a second packed data and one of a third plurality of elements of a third packed data;
   producing a fifth packed data having a fifth plurality of elements, each of the fifth plurality of elements being minimum value of one of the second plurality of elements and one of the third plurality of elements; and
   producing the first packed data, each of the first plurality of elements being one of the fifth plurality of elements subtracted from a corresponding one of the fourth plurality of elements.

10. The method of claim 1 further comprising:
    producing a fourth packed data having a fourth plurality of elements, each of the fourth plurality of elements being one of a second plurality of elements of a second packed data minus the corresponding one of a third plurality of elements of a third packed data saturated at zero;
    producing a fifth packed data having a fifth plurality of elements, each of the fifth plurality of elements being one of the third plurality of elements minus the corresponding one of the second plurality of elements saturated at zero;
    producing the first packed data, each of the first plurality of elements being a bitwise logical OR of one of the fourth plurality of elements and the corresponding one of the fifth plurality of elements.

11. The method of claim 1 wherein the corresponding bit positions comprise bit positions 10–17 in a first partial product, bit positions 8–15 in a second partial product, bit positions 6–13 in a third partial product, and bit positions 4–11 in a fourth partial product.

12. The method of claim 1 wherein the corresponding bit positions comprise bit positions 0–7 in a first partial product, bit positions 2–9 in a second partial product, bit positions 4–11 in a third partial product, and bit positions 6–13 in a fourth partial product.

13. The method of claim 1 wherein the partial product selectors are used to insert each element of the first packed data into the bit positions of one or more of the plurality of partial products either by selecting booth encoded multiplicand bits or by selecting bits from a corresponding element of the first packed data in response to receiving a control signal.

14. The method of claim 1 wherein the partial product selectors are used to insert an element of the first packed data into the bit positions of one or more of the plurality of partial products by selecting among a plurality of standard booth encoded inputs and an extra input comprising the element of the first packed data.

15. The method of claim 1 wherein the partial product selectors are used to insert each element of the plurality of elements of the first packed data into the bit positions of one or more of the plurality of partial products by logically combining booth encoded multiplicand bits and bits from an element of the first packed data.

16. An apparatus comprising:
    a multiplier to produce a plurality of partial products;
    a plurality of partial product selectors to insert an element of a first plurality of elements of a first packed data into and in substitution for bit positions of one or more of the plurality of partial products by using partial product selectors corresponding to the bit positions; and
    an adder to receive the plurality of partial products and produce a first result including a field containing a sum of the first plurality of elements.

17. The apparatus of claim 16 wherein the plurality of partial product selectors are coupled to receive a portion of an operand, the operand being zero.

18. The apparatus of claim 17 wherein the operand has a single element.

19. The apparatus of claim 17 wherein the operand is a packed data.

20. The apparatus of claim 8 wherein the adder comprises:
- a plurality of carry save adders operable to receive the plurality of partial products and produce a set of carry and sum signals; and
- a carry lookahead adder operable to receive the set of carry and sum signals and generate the first result, the first result being the sum of the set of carry and sum signals.

21. The apparatus of claim 16 further comprising a shifter coupled to receive the first result and shift the first result to produce a second result having a least significant bit and to align the field with the least significant bit of the second result.

22. The apparatus of claim 16 further comprising:
- a first circuit to receive a second packed data having a second plurality of elements and a third packed data having a third plurality of elements to produce a fourth packed data having a fourth plurality of elements, each of the fourth plurality of elements being maximum value of one of the second plurality of elements and one of the third plurality of elements;
- a second circuit to receive the second packed data and the third packed data to produce a fifth packed data having a fifth plurality of elements, each of the fifth plurality of elements being minimum value of one of the second plurality of elements and one of the third plurality of elements; and
- a third circuit to receive the fourth packed data and the fifth packed data to produce the first packed data, each of the first plurality of elements being one of the fifth plurality of elements subtracted from a corresponding one of the fourth plurality of elements.

23. The apparatus of claim 16 further comprising:
- a first circuit configured to receive a second packed data having a second plurality of elements and a third packed data having a third plurality of elements to produce a fourth packed data having a fourth plurality of elements, each of the fourth plurality of elements being one of the second plurality of elements minus the corresponding one of the third plurality of elements saturated at zero;
- a second circuit configured to receive the second packed data and the third packed data to produce a fifth packed data having a fifth plurality of elements, each of the fifth plurality of elements being one of the third plurality of elements minus the corresponding one of the second plurality of elements saturated at zero; and
- a third circuit configured to receive the fourth packed data and the fifth packed data to produce the first packed data, each of the first plurality of elements being a bitwise logical OR of one of the fourth plurality of elements and the corresponding one of the fifth plurality of elements.

24. The apparatus of claim 16 wherein the corresponding bit positions comprise bit positions 10–17 in a first partial product, bit positions 8–15 in a second partial product, bit positions 6–13 in a third partial product, and bit positions 4–11 in a fourth partial product.

25. The apparatus of claim 16 wherein the corresponding bit positions comprise bit positions 0–7 in a first partial product, bit positions 2–9 in a second partial product, bit positions 4–11 in a third partial product, and bit positions 6–13 in a fourth partial product.

26. The apparatus of claim 16 wherein the partial product selectors insert an element of the first packed data into corresponding bit positions of one or more of the plurality of partial products responsive to a control signal indicating whether to select booth encoded multiplicand bits or to select bits from the element of the first packed data.

27. The apparatus of claim 16 wherein the partial product selectors corresponding to the bit positions of one or more of the plurality of partial products receives a plurality of booth encoded inputs and an input comprising an element of the first packed data and selects among the inputs received to insert the element of the first packed data into the corresponding bit positions.

28. The apparatus of claim 16 wherein the partial product selectors, used to insert each element of the plurality of elements of the first packed data into corresponding bit positions of one or more of the plurality of partial products, logically combine booth encoded multiplicand bits with bits of an element of the first packed data.

29. An apparatus comprising:
- multiplier to generate a plurality of partial products to produce a product of multiplication having M×N bits, wherein the number M equals P×Q and the number N equals R×Q;
- a plurality of partial product selectors to insert an element of a first plurality of elements, each of the plurality of elements having Q bits, into and in substitution for Q bit values in bit positions of one or more of a plurality of partial products by using partial product selectors corresponding to the bit positions; and
- an adder to receive the plurality of partial products and to produce a first result including a field containing a sum of S elements of the plurality of elements, wherein S is greater than P.

30. The apparatus of claim 29, wherein S is also greater than R.

31. The apparatus of claim 30, wherein Q is equal to eight.

32. The apparatus of claim 31, wherein M is equal to sixteen.

* * * * *

UNITED STATES PATENT AND TRADEMARK OFFICE
CERTIFICATE OF CORRECTION

PATENT NO. : 6,377,970 B1  Page 1 of 1
DATED : April 23, 2002
INVENTOR(S) : Abdallah et al.

It is certified that error appears in the above-identified patent and that said Letters Patent is hereby corrected as shown below:

Column 5,
Line 64, delete "PMA", insert -- PMAD --.

Signed and Sealed this

Fifth Day of November, 2002

Attest:

Attesting Officer

JAMES E. ROGAN
Director of the United States Patent and Trademark Office